(12) United States Patent
Breisacher

(10) Patent No.: US 7,891,850 B2
(45) Date of Patent: Feb. 22, 2011

(54) BUMPER MODULE

(75) Inventor: Michael Breisacher, Rochester Hills, MI (US)

(73) Assignee: Peguform GmbH, Bötzingen (DE)

( * ) Notice: Subject to any disclaimer, the term of this patent is extended or adjusted under 35 U.S.C. 154(b) by 84 days.

(21) Appl. No.: 12/303,020

(22) PCT Filed: May 25, 2007

(86) PCT No.: PCT/EP2007/004677

§ 371 (c)(1), (2), (4) Date: Dec. 1, 2008

(87) PCT Pub. No.: WO2007/140892

PCT Pub. Date: Dec. 13, 2007

(65) Prior Publication Data
US 2009/0201691 A1 Aug. 13, 2009

(30) Foreign Application Priority Data

Jun. 2, 2006 (DE) .................... 10 2006 026 255

(51) Int. Cl.
*B60Q 1/00* (2006.01)
(52) U.S. Cl. .................... 362/505; 362/506; 362/507; 29/453
(58) Field of Classification Search ......... 362/505–507, 362/547; 29/453, 464, 281.5
See application file for complete search history.

(56) References Cited

U.S. PATENT DOCUMENTS

| 6,729,681 | B2 * | 5/2004 | Yustick ................. 296/193.01 |
| 7,014,257 | B2 * | 3/2006 | Lazzeroni et al. ...... 296/203.02 |
| 7,097,239 | B2 * | 8/2006 | Lazzeroni ............. 296/203.01 |
| 7,234,741 | B1 * | 6/2007 | Reynolds et al. ........... 293/117 |
| 7,303,219 | B2 * | 12/2007 | Trabant et al. .............. 293/155 |
| 7,331,413 | B2 * | 2/2008 | Okai et al. ................ 180/68.4 |
| 2002/0073529 | A1 | 6/2002 | Yustick |

FOREIGN PATENT DOCUMENTS

| DE | 196 15 026 A1 | 10/1996 |
| DE | 60206672 | 8/2002 |
| DE | 102004023090 | 12/2005 |
| DE | 102004026881 | 12/2005 |
| EP | 1 600 361 A | 11/2005 |
| EP | 1623 873 A | 2/2006 |
| EP | 1634800 | 3/2006 |
| WO | WO 2006/120359 | 11/2006 |

* cited by examiner

*Primary Examiner*—Ali Alavi
(74) *Attorney, Agent, or Firm*—Ursula B. Day; Henry M. Feiereisen

(57) ABSTRACT

The present invention relates to a bumper module 1 having an integrated support structure for headlight 6, by means of which the installation of headlight 6 with a visually satisfactory profile in the front region of the motor vehicle is facilitated.

15 Claims, 5 Drawing Sheets

BUMPER MODULE

BACKGROUND OF THE INVENTION

The present invention refers to a bumper module according to the preamble of claim 1 and a method of producing a bumper module.

Usually headlight arrangements for motor vehicles are oriented and attached corresponding to their theoretically exact position at the front end support. The orientation of the headlight is carried out in a headlight adjustment facility during the pre-assembly of the front end module. Due to large deviations of the adjoining body construction components, such as for example the longitudinal beam, hood or fender, oftentimes an extensive post-adjustment of the headlights is required in order to realize the required orientation of the courses of gaps and joints. For this purpose, besides expensive headlight adjustment facilities, likewise expensive tolerance adjustment facilities are additionally utilized for final adjustment. Thus, the adjustment of the headlights is overall a relatively expensive step regarding cost and time input.

An exact, uniform and narrow gap und joint course contributes to a substantially larger part of the valuation of the motor vehicle when arranging the headlights, than their theoretically exact orientation. It is therefore advantageous to place the headlight into an opening of a single component such that the uniform joint course can be realized without problems.

In DE 196 15 026 A1, an attachment device for a headlight having a headlight housing is described, wherein the headlight housing is mounted by means of spring loaded catch-or clip elements in the marginal zone of an opening of an assembly component of a front end module. Such an assembly component may be for example a bumper covering. The head light housing is detachable from inside the engine cavity by means of the afore-stated catch-or clip elements. When changing the bulbs or exchanging the entire headlight, a sufficient space must be kept free, This space is not usable for the other assembly components, which is a disadvantage in view of the increasing trend to build more compact motor vehicles.

In EP 1 623 873 A1, a bumper of a motor vehicle is described, which includes a bumper covering, two support structures for headlights and a reinforcement which connects the two support structures for the headlights to each other. While this arrangement allows the headlight units to be placed into the support structure from above or from the front in a space saving manner, however, because this is a very rigid arrangement, after installation of the bumper module, various components will have to have their gap-and joint course adapted to the headlight, thereby requiring an additional adjustment step.

Thus, there is a continued demand for an attachment arrangement for headlights, which permits to install the headlights with a uniform and narrow gap-and joint course without additional need for adjustment and at the same time to realize an exchange of either the bulbs or the headlights itself in space saving manner and without any problems.

This object is solved by means of a bumper module which includes a bumper covering, at least one support structure open towards an upper direction for a headlight and a headlight installed into the support structure, wherein the support structure is integrated into the bumper covering in a trough-shaped manner, whereby the shape of the support structure is configured corresponding to the shape of the headlight and the headlight is mountable into the support structure form-fittingly with a uniform gap-and joint course; This object is further solved by a method for the production of a bumper module for a motor vehicle with a front end support, which includes a bumper covering at least one support structure for headlights and integrated headlights, wherein the bumper covering is first provided with a support structure for a headlight, wherein the support structure is adapted to the shape of the headlight such that the headlight is insertable with a uniform gap-and joint course, the headlights in which at least one support structure is inserted and thereafter the bumper module mounted with headlight is connected by means of a front end support into a front end module. Advantageous embodiments are reflected in the following paragraphs.

SUMMARY OF THE INVENTION

A uniform gap-and joint course in the area of the headlight without an extensive pre-and/or post adjustment of assembly components is realized in that the headlight is first connected firmly to the bumper covering by means of a support structure which is upwardly open and thus combined into a bumper module for installation at a front end support which includes at least the bumper covering, the headlight and the corresponding support structure. The shape of the support structure is chosen so it corresponds to the shape of the headlight such that it can be form-fittingly installed with a uniform gap-and joint course into the support structure. Thus, the support structure has a trough-shaped configuration extending along the essential and most visible areas of the course of the joint between the headlight and body assembly components. The support structure includes guides which position headlights and bumper covering relative to each other in a defined manner. In this manner a problem-free installation of the headlight with a uniform gap is realized Usually, the bumper covering is installed only after the headlights have been installed, so the bumper covering must be provided with correspondingly large recesses in the headlight areas so that during the installation, the bumper covering can be guided past the headlights. As a result, relatively large gaps or junctures necessarily ensue between the headlight and the bumper covering.

By reversing this installation sequence, the installation of a form-fitted support structure into which the headlight can be mounted with a minimally sized juncture, is realized.

The support structure can thereby encompasses the headlight in an undercut manner, wherein this undercut area is a component of the lacquered bumper covering with the added advantage that the gap between the headlight and the bumper covering is also lacquered, thus additionally improving valuation.

The support structure can be molded unitary with the bumper covering resulting in the production-technical advantage that the bumper covering together with the support structure can be produced as one piece in one production step, wherein as the usual production method, for example, a injection molding method with thermoplastic plastics is contemplated.

However, it is also advantageous if the support structure is configured as a separate component which is firmly connected via a clip-, weld- and/or screw connection. This embodiment has the advantage that the support structure can be produced from a material different than that of the bumper covering. Thus, different plastics materials can be utilized for the bumper covering and the support structure, which can be selected also in accordance with various stability demands.

An advantageous embodiment contemplates that the support structure is produced as a separate component which includes additional webs that provide added stiffness to the support structure, in order to absorb high dynamic stress or inertia forces in heavy embodiments of the headlight.

In a further advantageous embodiment, separate support structures are provided for the two front headlights and that are produced from a relatively stable and rigid thermoplastic plastic to thus provide a firm rest to the headlight, while the bumper covering can be produced from a more flexible material wherein in the final installation of the front end module, an additional adaptation of the bumper module to the other body components can be realized. In such an embodiment, in the final installation, the headlight can be adjusted by simple guides or attachment elements to the other body components, without the need to employ additional special and expensive tolerance compensation elements in order to realize the value-increasing uniform joint course.

The support structure is advantageously selected such that it is configured in the shape of a pocket or drawer supporting the installed headlight essentially laterally and from below. The pocket or the drawer shape can be configured in such a way that it is possible to arrange an additional support in the rear area. In the support structure according to the invention, the headlight can be installed, without regard to spatial shortage, from above and/or from the front since no additional room is required from the motor side when changing the headlight or bulbs thereof.

In a further advantageous embodiment, the support structure includes elements for guiding, attaching and tolerance adaptation of the headlight, which, on the one hand serves the attachment and adjustment of the headlight itself, and on the other hand, also supports the attachment and the adjustment of the bumper to the front end support. Thus, by means of simple guidance- and attachment elements, a form fitted combination with the other body components in the front area is realized. Moreover, additionally, a structural unit together with the adjoining front end support can be realized via support surfaces, form fitting connections or screw connections.

The support structures can also meet the requirement of additional functions and serve as a support for additional assembly components, such as for example cables, hoses or sensors.

It is also an object of the present invention to provide a method for the production of a front end module for a motor vehicle in which the headlight is disposed in the front area without extensive pre-or post adjustment and with an optically clean joint course.

For that purpose, the headlight are first pre-installed together with the bumper covering and the support structures that are adjusted to the shape of the headlight as a bumper module, that subsequently can be connected with the front end support to a front end module. While it is conventional practice to date that the headlight is first connected to the front end support and adjusted with the aid of an expensive headlight adjustment device, with the method of the present invention a pre-adjustment is now superfluous. The headlights can be next fitted into the trough-shaped support structure without extensive effort by means of guidance and tolerance elements and with an optimal joint course. The bumper module resulting therefrom is according to the invention flexible enough that the adaptation to the remaining body assembly parts, such as, for example the hood and fender can be realized by simple attachment-and guidance elements. The flexibility of the bumper module is increased such that in a preferred embodiment of the present development, the support structures for each of the front headlights are arranged separately without any stiffening cross connections between the support structures.

BRIEF DESCRIPTION OF THE DRAWING

Further features and advantages of the invention are described as follows with reference to the drawings, where it is shown in.

DETAILED DESCRIPTION OF PREFERRED EMBODIMENTS

Figure 1:
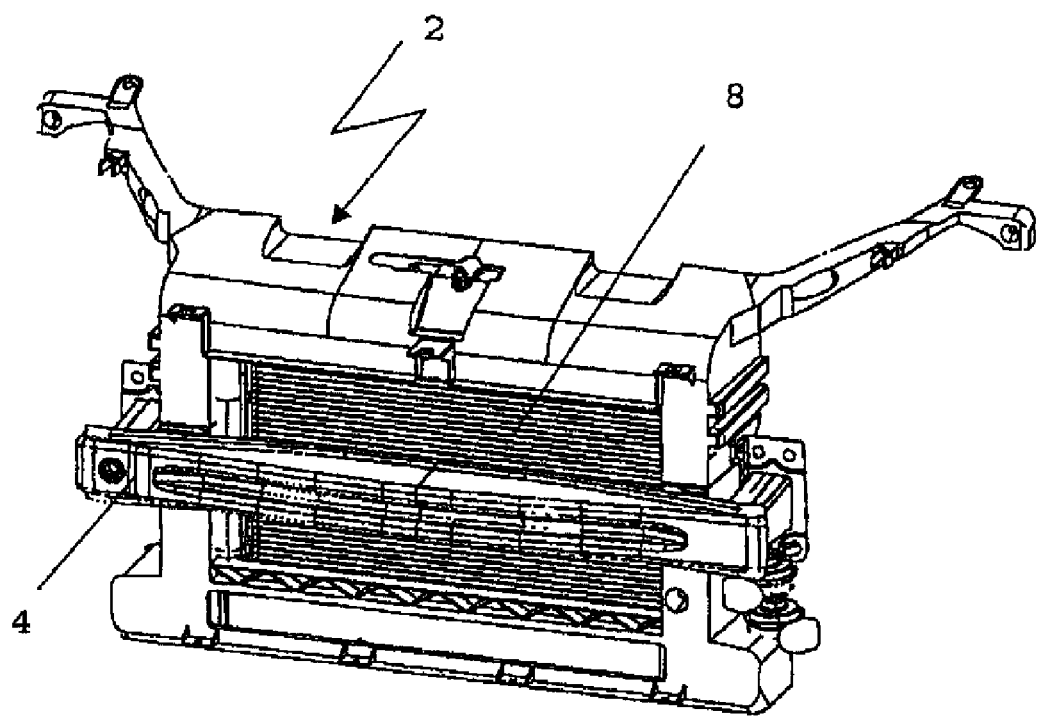
FIG. 1 a perspective illustration of a bumper module for installation to a front end support, FIG. 2 a perspective illustration of a bumper covering with support structure and an enlargement of a detail of the support structure, FIG. 3 a perspective illustration of a bumper module without the headlights, FIG. 3a an enlarged detail of the support structure of FIG. 3 in an exploded view, FIG. 3b a perspective illustration of a detail of a bumper module with support structure and separate headlight.
Figure 1:
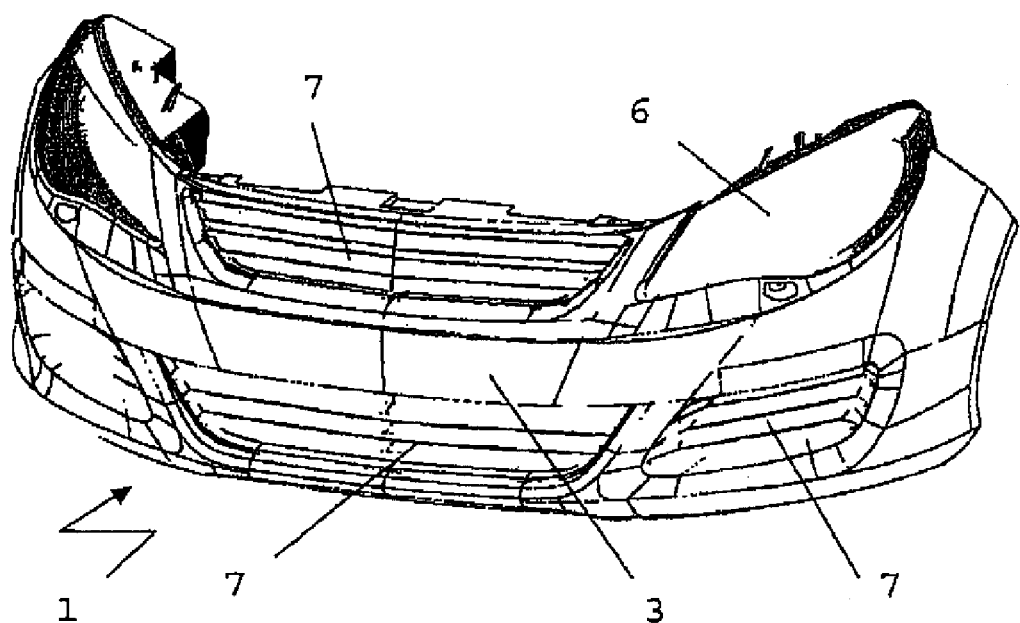

FIG. 1 shows the bumper module 1 according to the invention, which essentially consists of a bumper covering 3 showing integrated support structures 5 which, in this illustration are hidden by the front headlights 6, which are mounted in the support structures 5 with a uniform joint course.

Additional assembly elements are various radiator grill structures 7 that are integrated into the bumper covering 3. Furthermore, FIG. 1 shows separately drawn a front end support 2 with bumper-bending beam 4 and radiator 8. This subassembly can be combined with the bumper module 1 in the embodiment as shown in FIG. 1 directly into a front end module and connected, for example via corresponding support surfaces, form-fitting connections or screw connections, into a structural unit.

In a further embodiment, the subassembly consisting of a front end support 2, bumper-bending beam 4 and radiator 5 is first mounted at the vehicle and subsequently the pre-mounted bumper module, consisting of the bumper covering 3 with the support structures 5 and the radiator grill structures 7 the headlights 6 as well as possibly further assembly parts, are installed at the vehicle.

Figure 2:
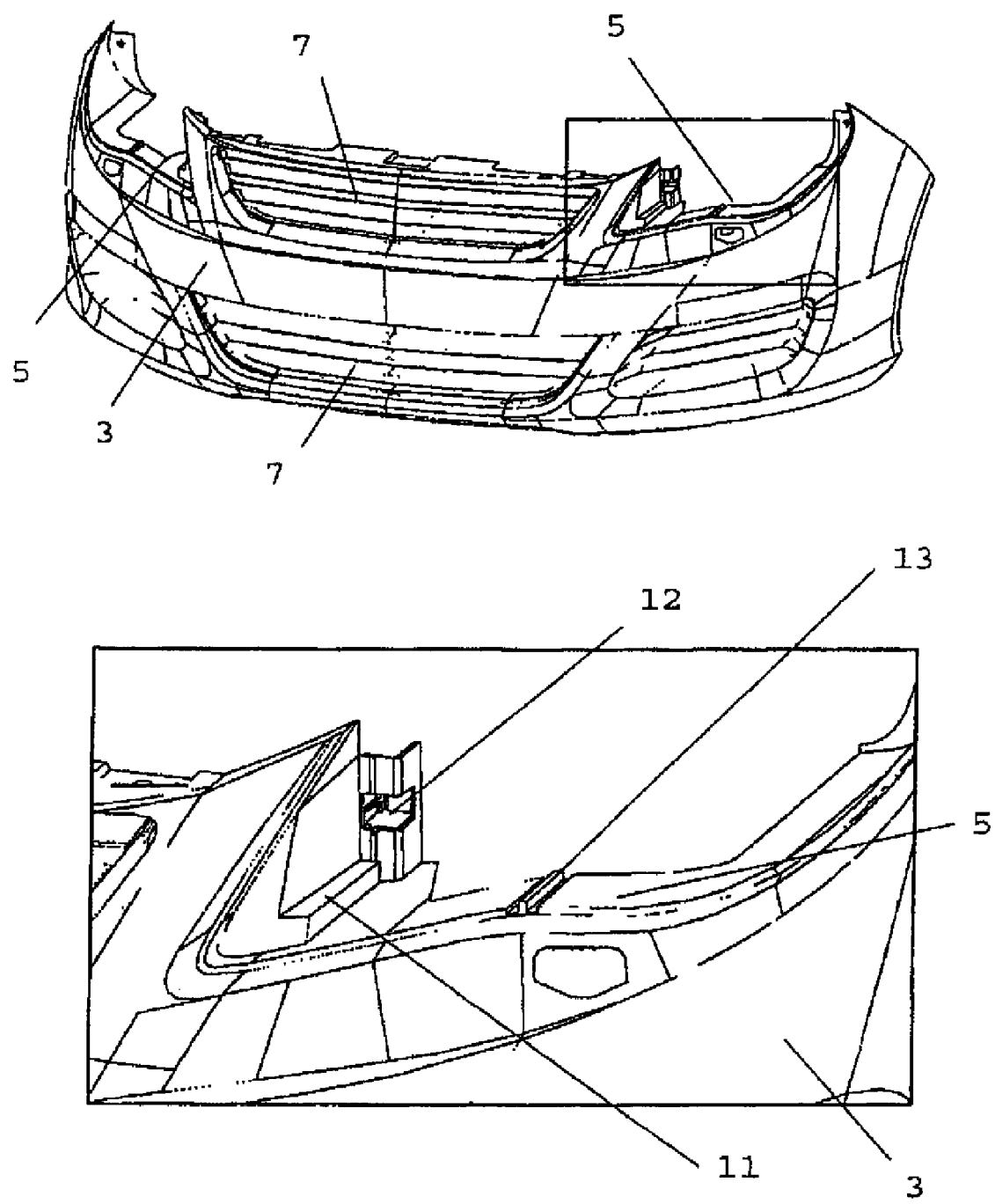

FIG. 2 shows a bumper covering 3 according to the invention with the support structure 5 for a headlight 6. In, this illustration, the trough-shaped configuration of the support structure 5 is seen, which is largely adapted to the shape of the headlight 6. Besides the support structure 5 for the headlight 6, the bumper covering 3 and additional radiator arrangements 7 are integrated into bumper covering 3. As further shown in FIG. 2 an enlarged detail of the support structure 5 is shown in which especially the guidance-attachment elements 11, 12, 13 for the headlight 6 are seen.

Figure 3:
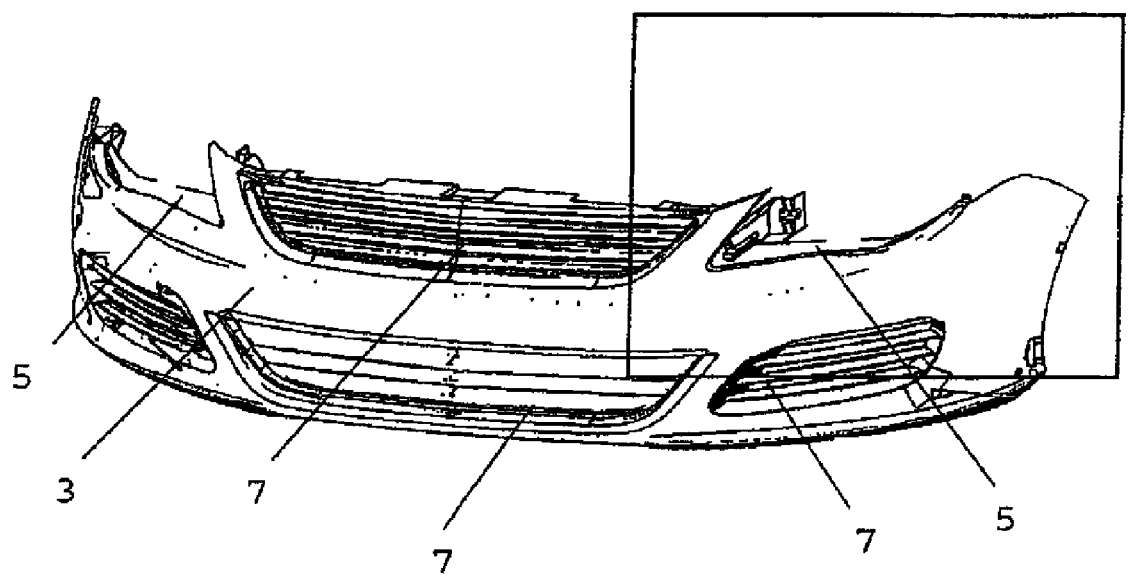
Figure 3A:
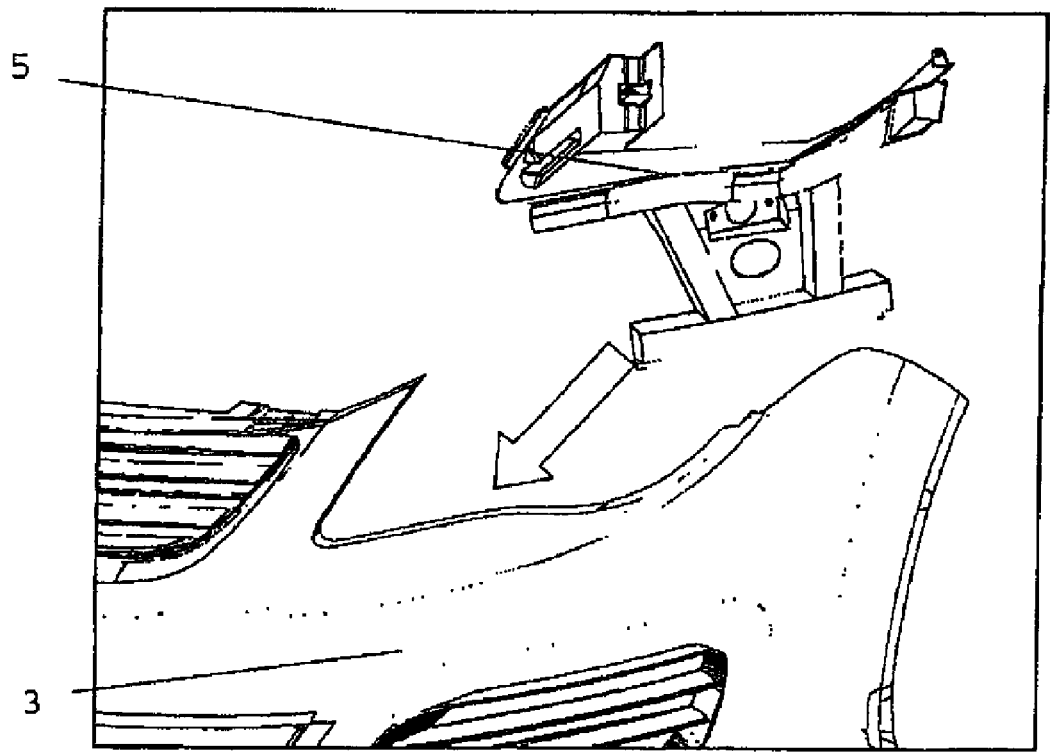

In FIG. 3, a detail of the support structure 5 is seen in the bumper covering 3. The support structure 5 here is a separate assembly component, which is distinctly shown in the enlarged detail in the exploded illustration of FIG. 3a. The separate embodiment likewise shows guidance- and attachment elements 11, 12 which can be utilized for the form-fitted arrangement of the headlight 6.

Figure 3B:
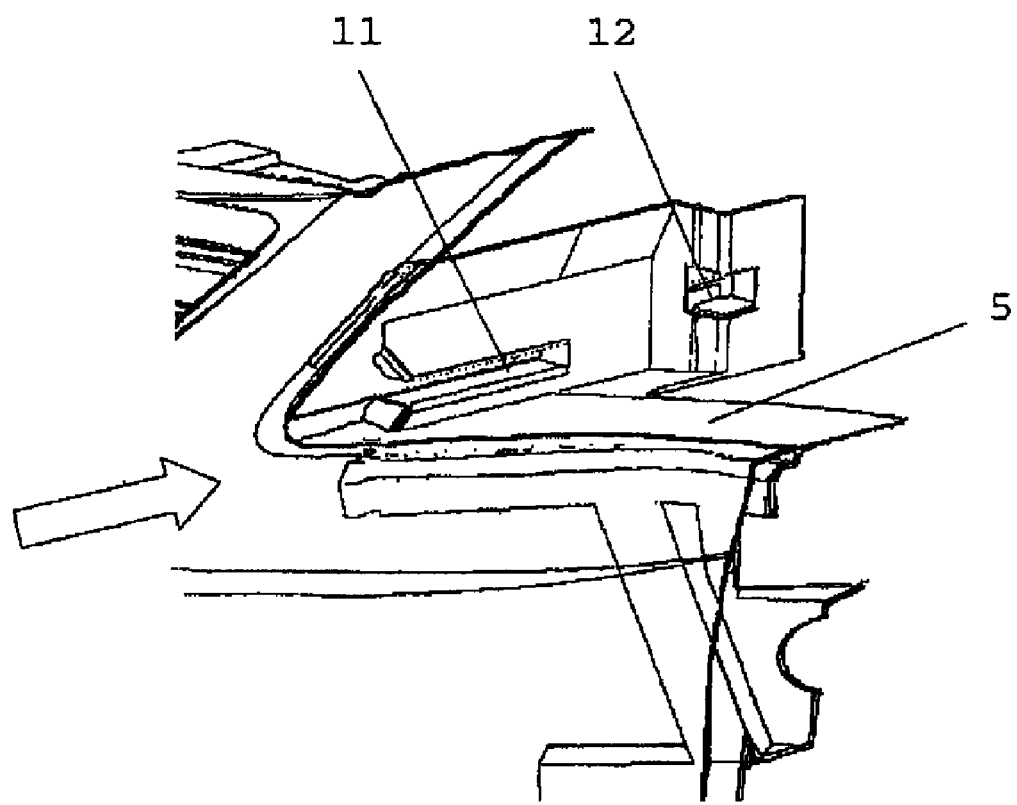
Figure 3B:
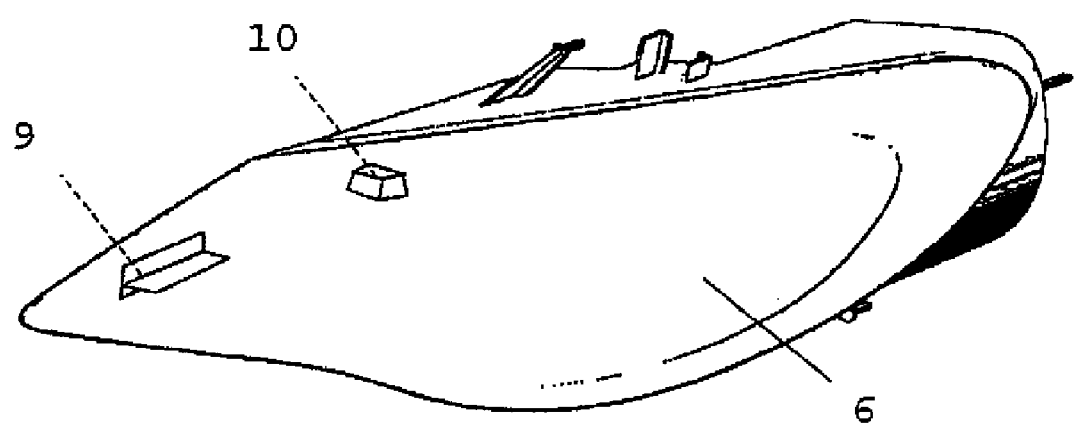

The headlight 6 itself is shown separately in FIG. 3b. At its rear side, the guidance and attachment elements 9, 10 are shown, which correspond with the guidance-and attachment elements 11, 12 of the support structure (5).

Figure 4:
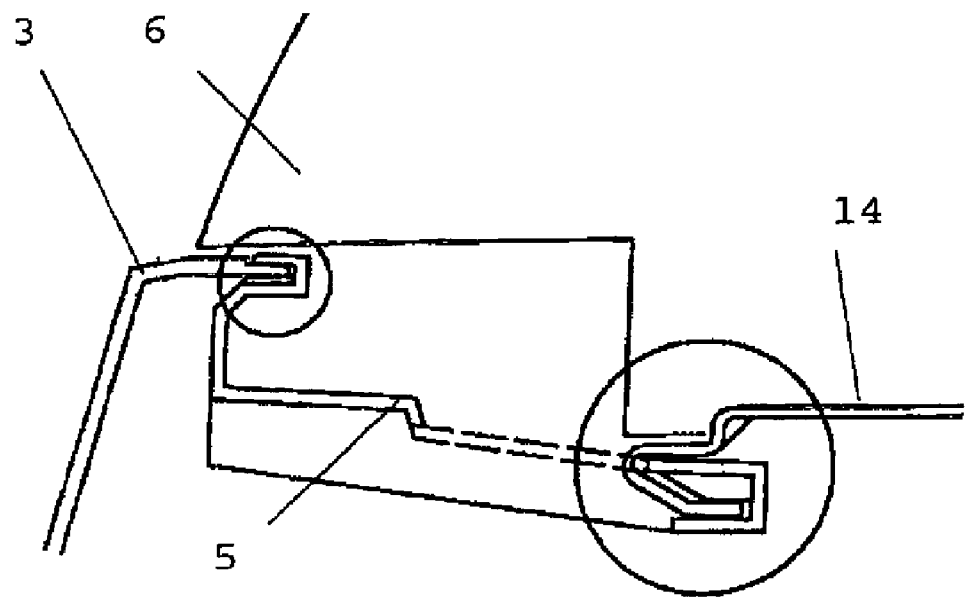
FIG. 4 an illustration of a section of a detail of the bumper module with guidance elements for positioning the headlights and FIG. 5 a perspective illustration of a structural unit including front end support and support structures.

FIG. 4 shows in a section detail the positioning of the headlight 6 by means of the support structure 5 in the bumper covering 3. There, a further guidance element 14 is seen, which is integrated into the headlight 6 and by means of which the headlight 6 is fixed in the support 5.

Figure 5:
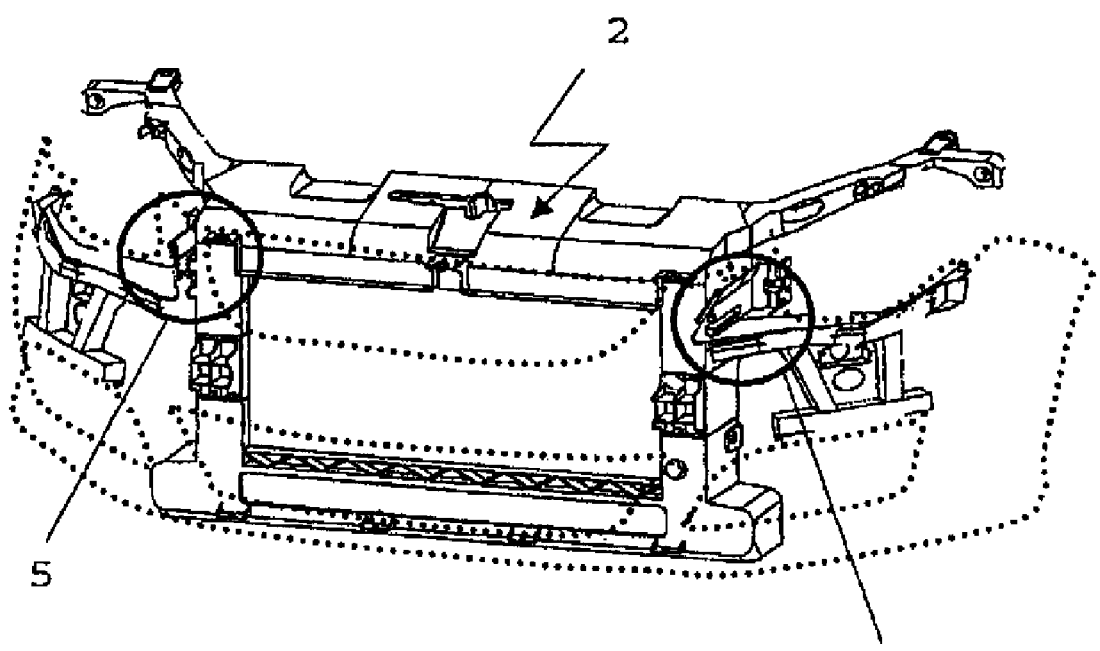

FIG. 5 shows the formation of a structural unit between the front end support 2 and the separate support structure 5 via support surfaces and form-fitting connections.

LIST OF REFERENCE NUMERALS

1 bumper
2 front end support
3 bumper covering
4 bumper-bending beam
5 support structure
6 headlight
7 radiator grill
8 radiator
9 guidance- and attachment element
10 guidance- and attachment element
11 guidance- and attachment element
12 guidance- and attachment element
13 guidance- and attachment element
14 guidance element headlight

What is claimed is:

1. A bumper module of a motor vehicle for mounting to a front end support comprising:
    a bumper covering,
    at least one support structure open in an upper direction, wherein the support structure is integrated into the bumper covering in a trough-shaped manner and the shape of the support structure is configured corresponding to the shape of a headlight and in a shape of an upwardly open pocket or drawer supporting the headlight in mounted condition laterally and from below in form-fitting manner in a uniform gap-and joint course, wherein the headlight is insertable into the support structure from a front position or from a position above the support structure.

2. The bumper module according to claim 1, wherein the support structure is molded directly onto the bumper covering.

3. The bumper module according to claim 1, wherein the support structure is configured as a separate assembly component and firmly connected with the bumper covering via a clamping, welding or screw connection.

4. The bumper module according to claim 1, wherein the bumper covering includes a separate support structure for each of the two front headlights.

5. The bumper module according to claim 1, wherein the bumper covering and the support structure are from plastic.

6. The bumper module according to claim 1, wherein the bumper covering and the support structure are made from different plastic materials.

7. The bumper module according to claim 1, wherein the headlight when installed is additionally supported from a rear side.

8. The bumper module according to claim 1, wherein the support structure includes elements for guidance, attachment and tolerance adjustment of the headlight selected from the group consisting of guide ribs, bores and domes.

9. The bumper module according to claim 1, wherein the headlight additionally includes elements for guidance, attachment and tolerance adjustment of the headlight selected from the group consisting of guide ribs, bores and domes.

10. The bumper module according to claim 1, wherein the support structure in mounted condition of the bumper module includes additional add-on parts, namely cables, hoses or sensors.

11. The bumper module according to claim 1, wherein the support structure, in a mounted position of the bumper module forms a structural unit with the bordering front end support via support surfaces, form-fitting connections or screw connections.

12. A method for the production of a front end module for a motor vehicle comprising:
    providing a front end support, a bumper covering and at least one support structure for supporting one or more headlights, first providing the support structure at the bumper covering with the support structure being in a shape adapted to the shape of the one or more headlight;
    inserting the at least one headlight with a uniform gap-and joint course into the support structure, and
    thereafter connecting the bumper module including the headlights with the front end support into a front end module.

13. The method for the production of a front end module according to claim 12, wherein the front end support, prior to assembly into a front end module, is provided as a sub-module together with the radiator and the bumper-bending beam.

14. The method for the production of a front end module according to claim 13, wherein the front end support is already, prior to assembly with the bumper module, connected with a body of a motor vehicle or is a part of the same.

15. A bumper module of a motor vehicle for mounting to a front end support comprising:
    a bumper covering,
    at least one support structure open in an upper direction, wherein the support structure is integrated into the bumper covering in a trough-shaped manner and the shape of the support structure is configured corresponding to the shape of a headlight and in a shape of an upwardly open pocket or drawer supporting the headlight in mounted condition laterally and from below in form-fitting manner with a uniform gap-and joint course, wherein the headlight is insertable into the support structure from a front position or from a position above the support structure; said support structure and the headlight include elements for guidance, attachment and tolerance adjustment of the headlight selected from the group consisting of guide ribs, bores and domes.

* * * * *